INVENTORS
P. J. Waller
BY C. J. Waterfield
Holcombe, Wetherill & Brisebois
ATTORNEYS INVENTORS
P. J. Waller
C. J. Waterfield
BY
Holcombe, Wetherill & Brisebois
ATTORNEYS INVENTOR
P. J. Waller
C. J. Waterfield
BY
Holcombe, Wetherill & Brisebois
ATTORNEYS 3,460,161

SECRECY TELEVISION APPARATUS WITH SCRAMBLED SYNCHRONIZING SIGNALS

Peter John Waller, Chelmsford, Essex, and Charles Jeffrey Waterfield, Brentwood, Essex, England, assignors to R. & R. Research Limited Filed Mar. 31, 1965, Ser. No. 444,296
Claims priority, application Great Britain, Apr. 7, 1964, 14,258/64
Int. Cl. H04n *1/44*
U.S. Cl. 178—5.1 10 Claims

ABSTRACT OF THE DISCLOSURE

Apparatus to provide a "scrambled" television signal conveying picture information and picture synchronisation information for reception by authorised receivers, in which scrambled signals the true synchronising signals are replaced either by modified signals having a different timing, or by signals having the nature and timing of the true synchronising signals, but having a different duration.

This invention relates to a television apparatus involving the broadcast of a television signal in a coded form, for restricting its intelligible reception to those authorised to do so. Such coding of television signals is sometimes called scrambling. In order to provide satisfactory reproduction as a picture, normal or conventional television receiver apparatus requires either suitable adaptation or an auxiliary unscrambling decoder unit.

The invention is particularly applicable for use in a subscription or pay television system, in which programme broadcast are only intelligibly reproducible by viewers who pay, or undertake to pay, a fee or its equivalent, perhaps in respect of each specific programme. The term "authorised" is to be taken therefore as including the receiver of a subscriber who has registered a payment or a debt liability in respect of the use of this receiver.

An object of the invention is to provide facility of coding and decoding a television signal while disturbing the picture waveform only minimally.

According to the invention there is provided a television apparatus comprising means to provide a coded television signal conveying picture information and picture synchronisation information for reproduction by authorised receivers, which coded signal bears also decoy synchronisation information for causing the synchronisation circuit in a conventional receiver to respond incorrectly.

The invention also provides a television coder comprising means to remove some or all of the synchronising signals from an incident conventional television signal and means to insert in the blanking intervals of the picture signal from which synchronising signals have been removed added signals which convey correct synchronising information for utilisation by authorised receivers and decoy synchronising information in a form for influencing the synchronisation circuits of conventional television receivers to respond incorrectly.

Such coded television signals tend to cause most television receivers to form the picture in a distorted manner, since their time bases tend not to be synchronised at the right instants in relation to the picture wave. Moreover, the time bases tend to be caused to operate incorrectly. Authorised receivers would be equipped to distinguish the correct instants to synchronise; pay television subscribers could be effectively charged for the use of decoding components or units before they could view intelligible pictures. The decoders can be arranged so that they are normally inoperative, except for a period which is predetermined in some manner, after a specified coinage has been deposited in a coin box.

Features and advantages of this invention will appear from the following description, of an embodiment thereof, given in conjunction with the accompanying drawings, in which.

Figure 1:
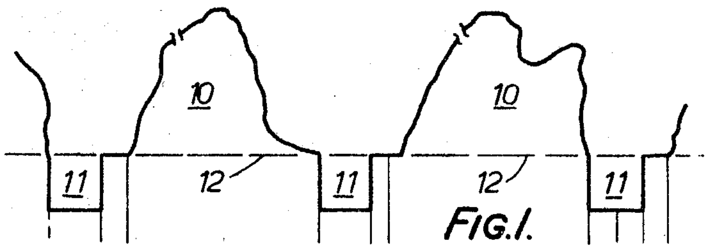
FIGURE 1 shows graphically the waveform of a television signal of a conventional type.
Figure 3A:
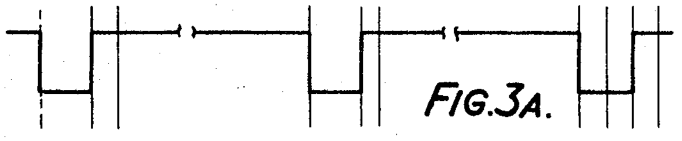
Figure 5:
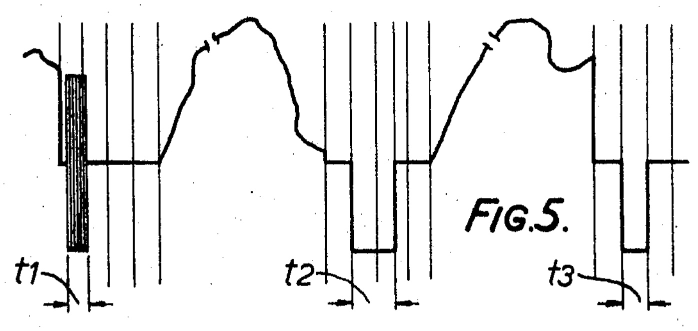
Figure 2:
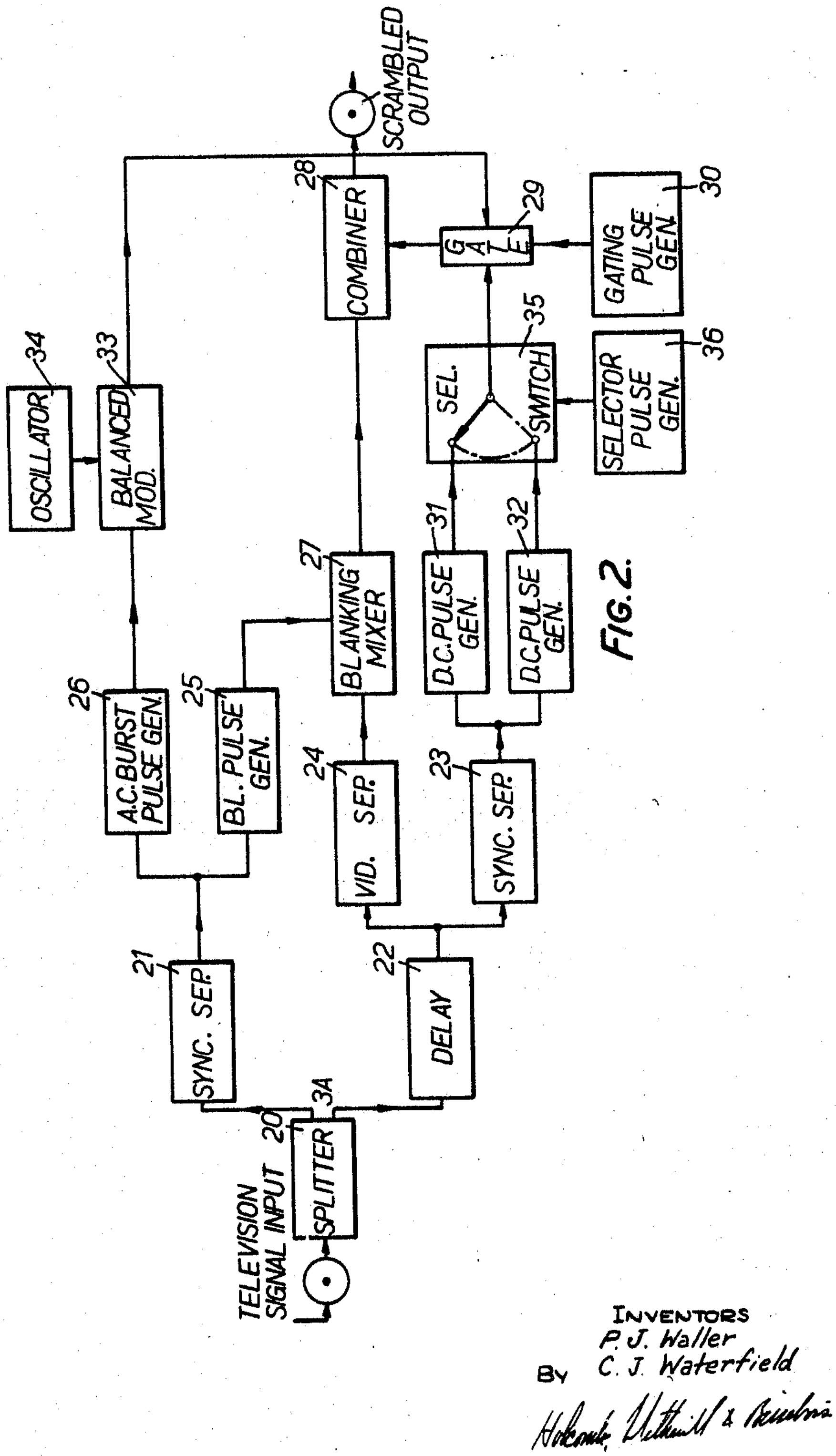
FIGURE 2 is a block schematic of an apparatus to code the signal shown in FIGURE 1.
Figure 4:
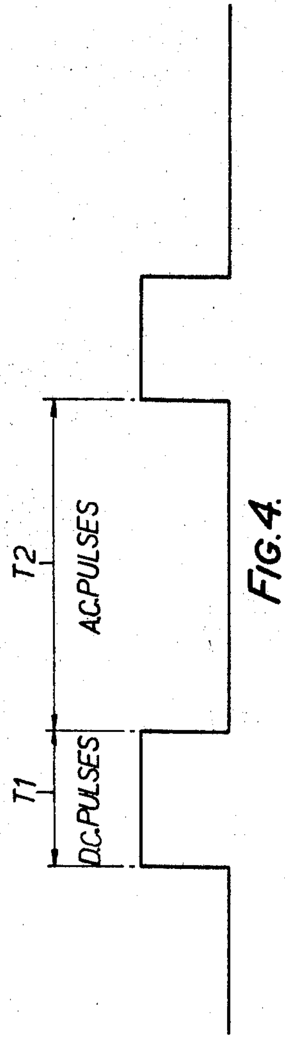
Figure 6:
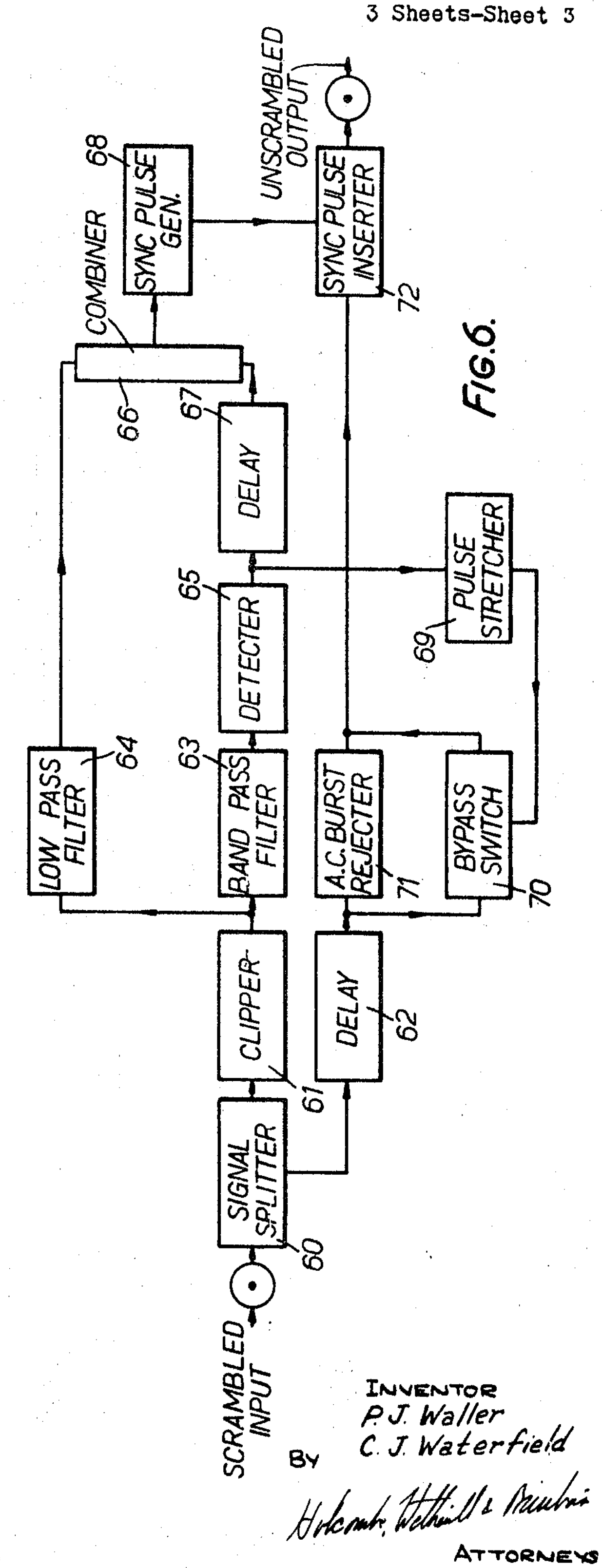

FIGURES 3A, B, C and D show, on the same time scale as used for FIGURE 1, the waveforms of signals appearing at various points in the apparatus of FIGURE 2 when used in code;

FIGURE 4 shows a gating waveform generated by a detail in FIGURE 1;

FIGURE 5 shows the waveform, on the same time scale as used for FIGURE 1, of the coded signal output of the apparatus of FIGURE 2; and FIGURE 6 illustrates in block schematic form one form of apparatus to decode the signal of FIGURE 5, to present it, essentially in the form of the original signal shown in FIGURE 1, for normal reproduction.

In this embodiment of the invention, coding is achieved by the deliberate inclusion in the transmitted television signal of added signals which are arranged to cause erroneous synchronisation in a conventional receiver, even if this is tuned to receive the signal. Hence an unintelligible image is reproduced, since synchronisation circuits operate incorrectly.

In this embodiment, regularly repeated synchronising pulses of constant width, which are present in a conventional television signal, are replaced by the added signals. The transmitted signal does, however, contain information for producing correct synchronisation in a special or adapted receiver. The receiver may incorporate or have as an auxiliary, decoding apparatus which is rendered operative only on the paying of a fee, as by means of a coin box, and may be rendered inoperative again at the end of a paid portion of a programme, in response to a further received signal, if programmes are being charged for.

Referring to FIGURE 1, the television signal shown is conventional in form; and has picture wave portions 10 and line synchronising portions 11 extending on opposite sides of a dashed line 12, which indicates black level. In this case, portions 10 extend positively and portions 11 negatively of line 12, but the invention is equally applicable to systems wherein the picture wave extends negatively of, and the synchronising pulses positively of, black level. This signal is fed to the coding apparatus of FIGURE 2 for its subsequent secret transmission in coded form.

Figure 3B:
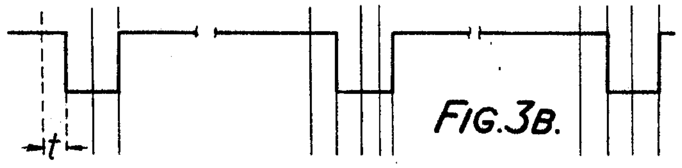

In the apparatus of FIGURE 2, the conventional television signal of FIGURE 1 is fed into a splitter 20, one output of which is taken to a sync separator 21 from which undelayed synchronising pulses, as illustrated in FIGURE 3A, are obtained. The second output from splitter 20 is fed to a signal delay circuit 22 the output of which drives both a sync separator 23 and a picture signal separator 24; thus delayed separated sync pulses and picture waveform signals delayed by a time *t* as shown in FIGURES 3B and 3C respectively are obtained.

Undelayed synchronising pulses from separator 21 are applied to a blanking pulse generator 25 and to an A.C. burst gating pulse generator 26 for their triggering or the like.

Figure 3C:
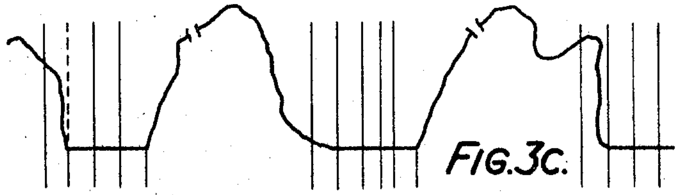
Figure 3D:
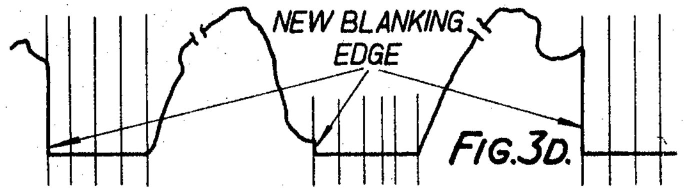

The effect of generator 25 is the waveform shown in FIGURE 3D which differs from the video waveform in FIGURE 3C in that the blanking periods are each extended by a time $t$ by the action of a pulse from the blanking pulse generator triggered by the leading edges of the waveform shown in FIGURE 3A.

The delayed picture signal from separator 24 is mixed with the output from 25 in a blanking mixer 27 to obtain a signal waveform as shown in FIGURE 3D, this signal is applied to one input of a pulse and video combiner 28. The other input to combiner 28 is provided by the output signal from a gate 29 which, under the control of selection pulses from a generator 30, selects either D.C. pulses from either one of two D.C. pulse generators 31 or 32 or A.C. pulses from an A.C. burst generator 33. The function of generator 30 is thus to vary the nature of the added signals, preferably according to a programme.

The pulses produced by generator 30 are shown in FIGURE 4. During the period T1, gate 29 applies D.C. pulses from generator 31 or 32 to pulse and video combiner 28 and during period T2 A.C. pulses from generator 33 are applied to the combiner. The exact sequence of pulses from 30 may be chosen or adjusted to give the maximum scrambling effect, or some form of random selection may be used. Additional types of added signals may be controlled by pulses or the like from selection generator 30, so unauthorised unscrambling becomes even more difficult.

The A.C. burst generator 33 may consist of a double balanced modulator which is driven by A.C. oscillator 34 and by A.C. burst gating pulse generator 26 which is synchronised to the undelayed synchronising pulses. The levels of the two inputs to generator 33 are adjusted so that bursts of A.C. are obtained at the output. The two D.C. pulse generators 31 and 32 are arranged to produce pulses of width $t_2$ and $t_3$ respectively (see FIGURE 5). Both these generators are synchronised in response to the delayed synchronising pulses from separator 23. A switch 35, which is operated by pulses from a pulse generator 36, selects the D.C. pulses from either 31 or 32 according to a schedule or at random, and applies them to gate 29.

The general form of the coded output signal obtained from the pulse and video combiner 28 is shown in FIGURE 5. The signal consists of the original picture waves 10 delayed by a short period *t*, and with each of the blanking intervals extended by time *t*. In some blanking intervals there have been added A.C. pulses, in others D.C. pulses of varying widths, replacing the original synchronising pulses. It can be seen that the extended period of the blanking interval is partially occupied by an A.C. pulse of duration $t_1$. In the second and third blanking intervals there are D.C. pulses with durations of $t_2$ and $t_3$ respectively; both of these pulses can be seen to initiate with correct timing relative to the video signal. This simple combination of A.C. and D.C. pulses which are produced by generators synchronised to the waveform shown in FIGURES 3A and 3B may be elaborated by the use of more complex circuits. For instance, the D.C. pulses may be arranged to occur in either random or repetitive blocks of say 30 pulses per block: i.e. $T_1$ last 30 line scans. $T_2$ could, but need not, last for the remainder of a vertical scan.

Some conventional television receivers have synchronising circuits which are responsive to the times of both the initiation and the termination of a synchronising pulse. One such arrangement is known as "fly wheel" synchronising. Thus incorrect operations of the synchronising circuits will occur due to the incorrect terminating times of the D.C. pulses shown in FIGURE 5. Many other receivers in common use have a synchronising pulse generator which is triggered each time by the synchronising pulse in the received television signal. Such circuits usually respond somewhat to the initiation and perhaps termination of the blanking periods, and such circuits will respond when no D.C. pulse is present in a blanking period, such as the first line shown in FIGURE 5, to the transient at the beginning of the blanking period caused by its extension. The circuit will not respond to the A.C. pulse, but will of course respond to the D.C. pulses in the second and third lines of the waveform shown in FIGURE 5. The tendency for trigger synchronising circuits then is to be triggered sometimes by the sharp fall to black level of the picture wave at the beginning of the blanking period as extended, and sometimes by the D.C. pulses, which will have an overlining effect when present, and the picture will jitter so much as to be unintelligible. First references to conventional receivers in this specification should be read as covering the various types of receiver likely to be encountered for the reception of conventional or normal type television signals, such as the positively modulated signals shown in FIGURE 1. If programmes are to be charged for, their reproduction on conventional apparatus without the help of decoders should be of sufficiently low quality to persuade people to pay to use decoder units, such as the one described below.

The arrangement and distribution of these added A.C. and D.C. pulses is controlled by pulse generators 30 and 36 and need not necessarily be as shown in FIGURE 5. This scrambled signal may be applied as modulation of a carrier wave for transmission over the air or over a relay network, or the signal may be transmitted as it stands over cable to form a secret closed circuit television system.

One design of decoding apparatus suitable for unscrambling the scrambled signal of FIGURE 5 is shown in FIGURE 6. If carrier transmission is employed, the received carrier signal modulated by the scrambled composite video waveform is changed in frequency, amplified and detected in the usual manner and the waveform as shown in FIGURE 5 is obtained. This waveform is applied to a splitter 60 one output of which is used to drive pulse separator 61, and other output is fed to a signal delay circuit 62.

The D.C. and A.C. pulses separated from the picture waveform by separator 61 are applied to a band pass filter 63 and a low pass filter 64. The D.C. pulses are rejected by filter 63 while the A.C. pulses are accepted and fed to detector 65 from which pulses coincident in time with the A.C. pulses are obtained. The D.C. pulses passed by filter 64 are combined in a pulse combiner 66 with pulses from detector 65 which have been delayed an appropriate time by a pulse delay unit 67. The leading edges of output pulses from 66 are used to trigger a synchronising pulse generator 68 from which appear pulses recognisable as synchronising pulses by a conventional receiver.

When an A.C. pulse is present during the blanking period of the video waveform the resulting detected pulse at 65 is increased in width by a pulse stretching unit 69 and stretched, is used to open a circuit switch 70. The signal from the signal delay unit 62 containing this A.C. pulse is suppressed by a burst rejection filter 71. At all other times, i.e. when no A.C. pulse is incident, the delayed signal will be fed to a sync inserter 72 by-passing the filter 71 through switch 70 for insertion of pulses from synchronising pulse generator 68.

The function of the decoding unit then is effectively to reform the signal shown in FIGURE 1, since conventional type synchronising pulses exactly as shown at 11 in FIGURE 1 are inserted in place of the blacker then black signals as shown in FIGURE 5, both A.C. and D.C.

Returning to FIGURE 5, it should be noted that all the pulses, A.C. and D.C., contain synchronising information, because the initiation instance of all these added signals are used to time the triggering of a synchronising pulse from generator 68. Of the added pulses, the A.C. ones convey correct synchronising information only, although in a form unrecognisable by conventional television receivers, since these are equipped only to synchronise as in response to D.C. pulses such as shown at 11, FIGURE 1. The added pulses which are D.C., on the contrary, convey both correct synchronising information by virtue of their initiation or leading edges, and they also convey incorrect or decoy synchronising information, in that they have the wrong pulse width. In addition the fact that the blanking periods have been extended, also causes incorrect responses of synchronisation circuits in some conventional receivers which use trigger synchronising generators. Therefore the effect of the D.C. pulses such as shown in FIGURE 5 and the blanking period extensions combine to convey decoy synchronising information to some well-known types of television receiver. It should be noted however that all of the added pulses contain synchronising information for use by decoder units at authorised receiver stations; in contrast the second embodiment described below, makes use of decoy synchronising pulses that contain no correct synchronising information whatsoever, their only purposes being to cause the synchronisation circuits of unauthorised receivers to operate incorrectly.

Returning to FIGURE 6, the unscrambled output from the sync inserter 72 may be used to modulate a carrier in order to feed the aerial or I.F. terminals of a conventional receiver, or the video signal may be connected direct to another suitable point in the receiver.

The decoding apparatus described above may be incorporated in a complete television receiver or may be in a separate unit associated with a conventional receiver. In either case the arrangement of the decoding apparatus may be such that it is effective only after a subscriber to the system has satisfied a fee demand either by means of an associated coin or token operated mechanism, or by a debit registering device, or has fulfilled other conditions.

Variations on the system described may offer advantages as far as cost, security and reliability are concerned. For example, if the back porch period of the video waveform is extended, the width of the D.C. pulses may be increased. The front edge of the D.C. pulses need not coincide with the front edge of the delayed sync pulses as shown in FIGURES 3B and 5. Amplitude variation of either or both A.C. and D.C. pulses or variable blanking periods may provide more security. Decoding at a suitable intermediate frequency could reduce the cost of the receiver attachment.

In the system described above, the added pulses are each so timed that their initiation times all have synchronising significance, moreover, the D.C. pulses actually commence at the same times relative to the video waves as would conventional synchronising pulses. Neither of these simplifications are essential features, but each added pulse should contain, perhaps as a temporal event within it, information for enabling correct synchronisation at a special co-operative receiver, or at auxiliary decoding apparatus such as that described, for connection before a conventional receiver.

Generator 36 may advantageously control changeover switch 35 in the same way as generator 30 controls changeover by switch 29. Each of these switches should be always operative to select one of its inputs; or other means should provide that each blanking period has an added pulse, D.C. or A.C., replacing the usual synchronising pulse.

We claim:

1. In a television system, in combination: transmitter means including a source of a video signal including spaced picture signal components, blanking signals of predetermined duration separating said picture signal components and synchronising signals of predetermined nature and duration, said synchronising signals having a first predetermined timing with respect to said picture signal components;

signal altering means operable to replace said synchronising signals selectively by first and by second modified synchronising signals, said first modified synchronising signals having a nature different from said synchonising signals and having a second predetermined timing with respect to said picture signal components, and said second modified synchronising signals having said predetermined nature and timing and having a duration different from said predetermined duration, thereby to develop a modified video signal;

means for transmitting said modified video signal to each of a plurality of receiving positions;

receiver apparatus at a said receiving position including picture reproducing means operable by picture signals and synchronising signals having said predetermined nature and duration and having said first timing to reproduce said image;

synchronising signal reconstituting means operable in response to said modified video signal to replace said first and second modified synchronising signals by reconstituted synchronising signals having said predetermined nature and duration and having said first predetermined timing to develop a reconstituted video signal:

and means applying said reconstituted video signal to control the operation of said picture reproducing means.

2. The system as claimed in claim 1 wherein said signal modifying means includes:

signal separator means operable to remove said synchronising signals from said video signal to develop separated synchronising signals having said first predetermined timing;

signal delay means for delaying said video signal by a predetermined time-interval to develop a delayed video signal;

video separator means operable to separate said picture signal components from said delayed video signal to develop delayed picture signals;

synchronising separator means operable to separate said synchronising signals from said delayed video signal to develop delayed synchronising signals;

blanking pulse generator means operable in response to said separated synchronising signals to generate blanking extension signals;

mixer means operable in response to said blanking extension signals and said delayed video signal to develop a reblanked video signal;

first synchonising signal generator means operable in response to said separated synchronising signal to develop said first modified synchronising signals;

second synchronising signal generator means operable in response to said delayed synchronising signals to generate said second modified synchronising signals;

signal selector means operable to select said first or said second modified synchonising signals to provide selected synchronising signals;

and signal combining means operable to combine said selected synchronising signals and said reblanked video signal to develop said modified video signal.

3. The system as claimed in claim 2 wherein said second modified synchronising signal generator means includes:

first pulse generator means operable in response to said delayed synchronising signals to generate first pulses having the timing of said delayed synchronising signals and having a first duration different from said predetermined duration;

second pulse generator means operable in response to said delayed synchonising signals to generate second pulses having the timing of said delayed synchronising pulses and having a second duration different from said first duration and from said predetermined duration;

and further selector means operable to select said first pulses or said second pulses to provide said second modified synchronising signal.

4. The system as claimed in claim 2 wherein said first modified synchronising signal generator means includes voltage generator means operable to generate bursts of alternating voltage of predetermined frequency and duration in response to said separated synchronising signals, said bursts of alternating voltage having said second predetermined timing.

5. The system as claimed in claim 4 wherein said synchronising signal reconstituting means includes:

signal clipper means operable in response to said modified video signal to develop a separated signal including signal components representing said modified synchronising signals;

first filter means operable in response to said signal components representing said second modified synchronising signals to develop first trigger pulses having said first predetermined timing;

second filter means operable in response to said signal components representing said first modified synchronising signals to develop filtered signals;

detector means operable in response to said filtered signals to develop second trigger pulses having said second predetermined timing;

signal delay means operable in response to said second trigger pulses to develop delayed trigger pulses having said first predetermined timing;

and synchronising signal regenerating means operable in response to said first trigger pulses and said delayed trigger pulses to develop said reconstituted synchronising signals.

6. Video signal transmitting apparatus comprising a source of a video signal including spaced picture signal components, blanking signals of predetermined duration separating said picture signal components and synchronising signals of predetermined nature and duration, said synchronising signals having a first predetermined timing with respect to said picture signal components;

signal altering means operable to replace said synchronising signals selectively by first and by second modified synchronising signals, said first modified synchronising signals having a nature different from said synchronising signals and having a second predetermined timing with respect to said picture signal components, and said second modified synchronising signals having said predetermined nature and timing and having a duration different from said predetermined durtion, thereby to develop a modified video signal;

and means for transmitting said modified video signal to each of a plurality of receiving positions.

7. The apparatus claimed in claim 6 wherein said first modified synchronising signals comprise bursts of sinusoidal voltage of predetermined frequency.

8. The apparatus claimed in claim 6 wherein said second modified synchronising signals comprise selectively first pulses having said predetermined timing and having a first during different from said predetermined duration and second pulses having said predetermined timing and having a second duration different from said predetermined duration and from said first duration.

9. Television receiver apparatus comprising means for receiving a modified video signal including spaced picture signal components, blanking components separating said picture signal components, first modified synchronising signals having a first nature and having a first timing with respect to said picture signal components and second modified synchronising signals having a second nature and a variable duration and having a second timing with respect to said picture signal components; said receiver apparatus including:

picture reproducing apparatus operable in response to picture signal components and synchronising signals, said synchronising signals having said second nature and said second timing and having a predetermined duration;

synchronising signal reconstituting means operable in response to said modified video signal to replace said first and said modified video signals by reconstituted synchronising signals having said second nature, said second timing and said predetermined duration to develop a reconstituted video signal;

and means operable to apply said reconstituted video signal to said picture reproducing means.

10. The apparatus claimed in claim 9 wherein said synchronising signal reconstituting means includes:

signal clipper means operable in response to said modified video signal to develop a separated signal including signal components representing said modified synchronising signals;

first filter means operable in response to said signal components representing said second modified synchronising signals to develop first trigger pulses having said first predetermined timing;

second filter means operable in response to said signal components representing said first modified synchronising signals to develop filtered signals;

detector means operable in response to said filtered signals to develop second trigger pulses having said second predetermined timing;

signal delay means operable in response to said second trigger pulses to develop delayed trigger pulses having said first predetermined timing;

and synchronising signal regenerating means operable in response to said first trigger pulses and said delayed trigger pulses to develop said reconstituted synchronising signals.

References Cited

UNITED STATES PATENTS

| | | | |
|---|---|---|---|
| 3,081,376 | 3/1963 | Loughlin | 178—5.1 |
| 3,313,880 | 4/1967 | Bass | 178—5.1 |

ROBERT L. GRIFFIN, Primary Examiner

HOWARD W. BRITTON, Assistant Examiner